Aug. 25, 1953     D. G. GRISWOLD     2,649,773
DIFFERENTIAL PRESSURE OPERATED VALVE
Filed March 27, 1946     11 Sheets-Sheet 3

INVENTOR
Donald G. Griswold
BY Bacon + Thomas
ATTORNEYS

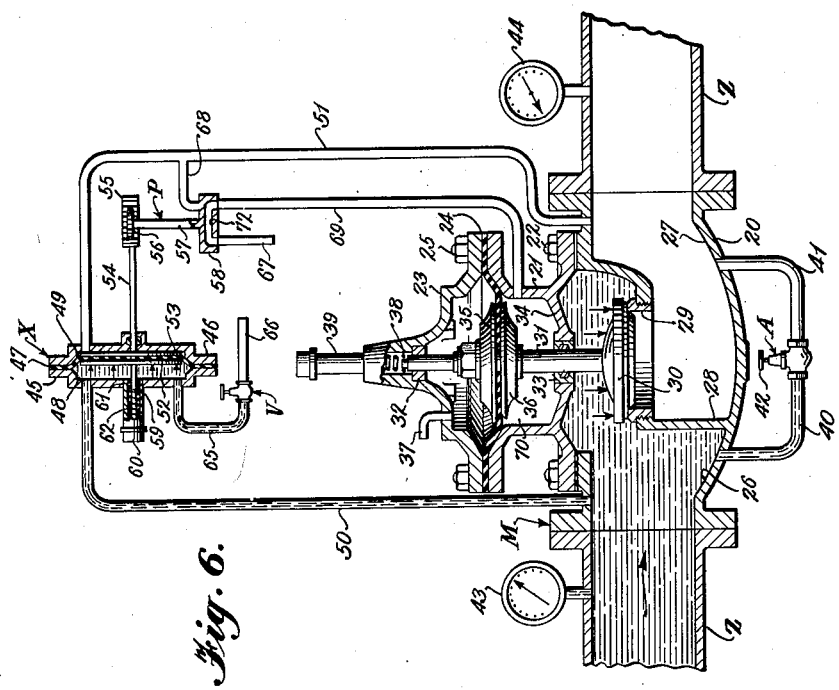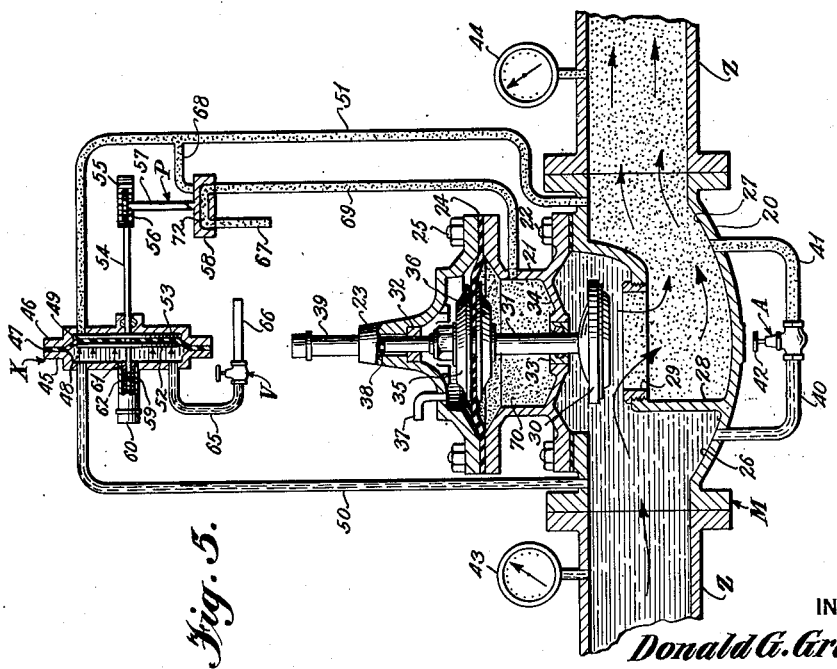

Aug. 25, 1953  D. G. GRISWOLD  2,649,773
DIFFERENTIAL PRESSURE OPERATED VALVE
Filed March 27, 1946  11 Sheets-Sheet 5
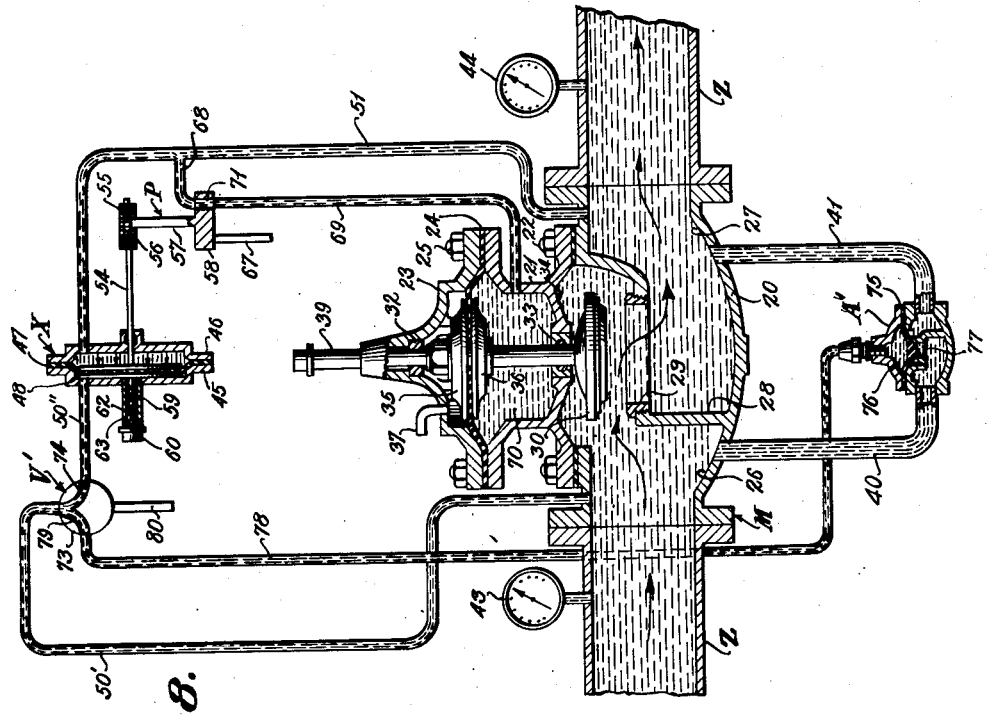
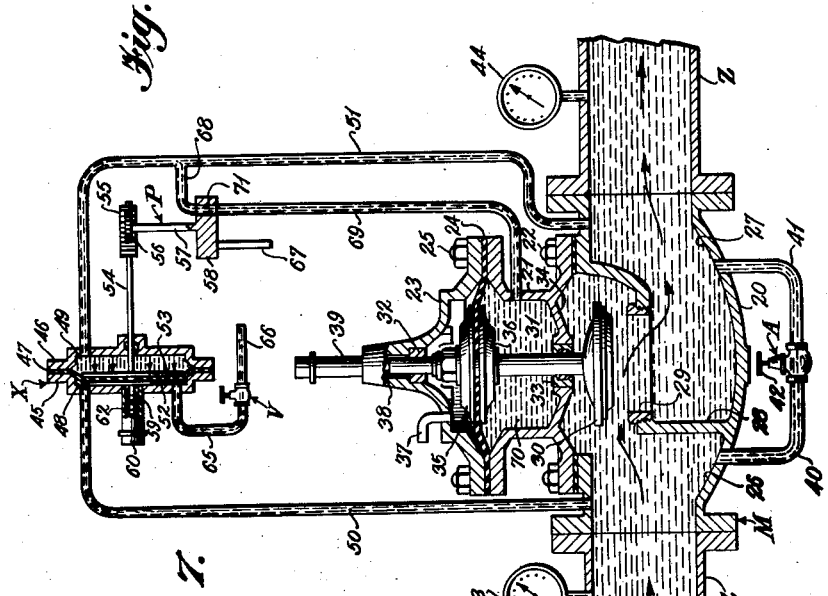
INVENTOR
Donald G. Griswold
BY Bacon + Thomas
ATTORNEYS

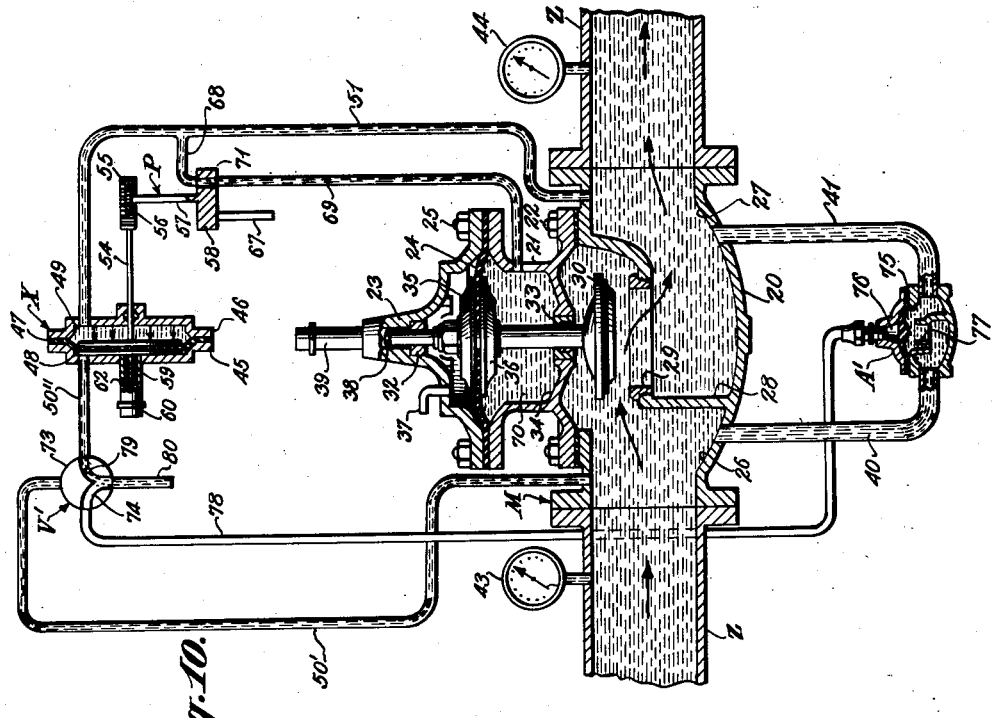

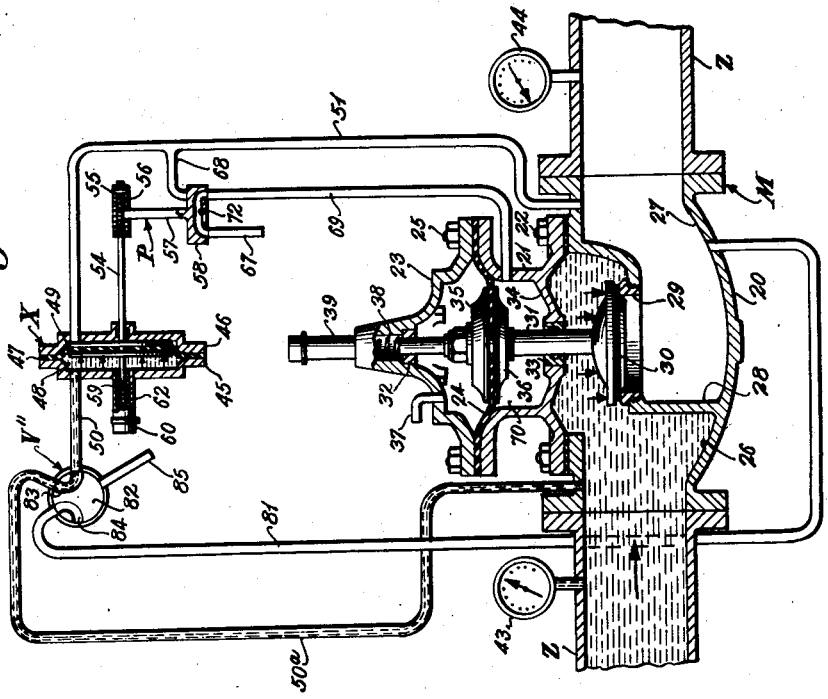

Aug. 25, 1953 D. G. GRISWOLD 2,649,773
DIFFERENTIAL PRESSURE OPERATED VALVE
Filed March 27, 1946 11 Sheets-Sheet 8
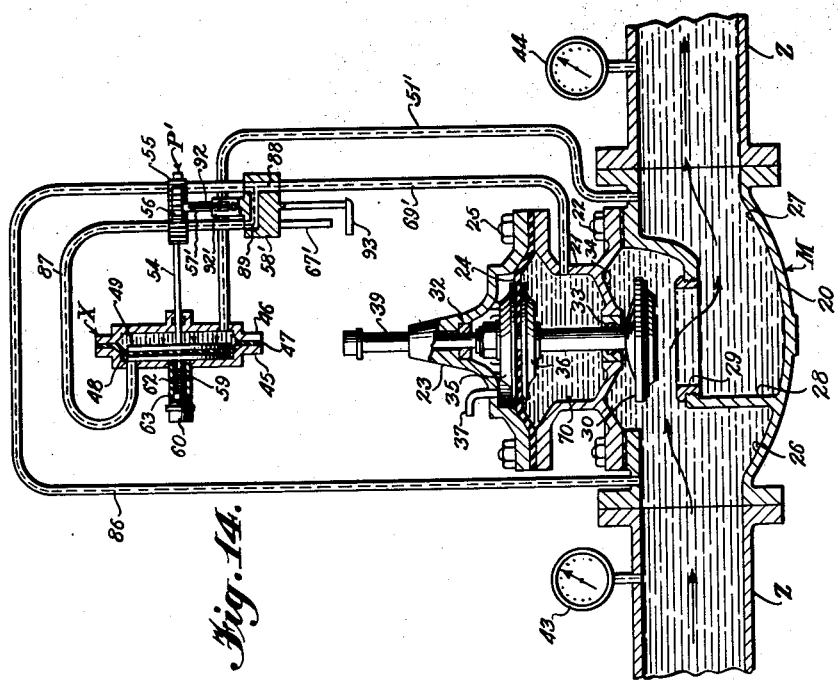
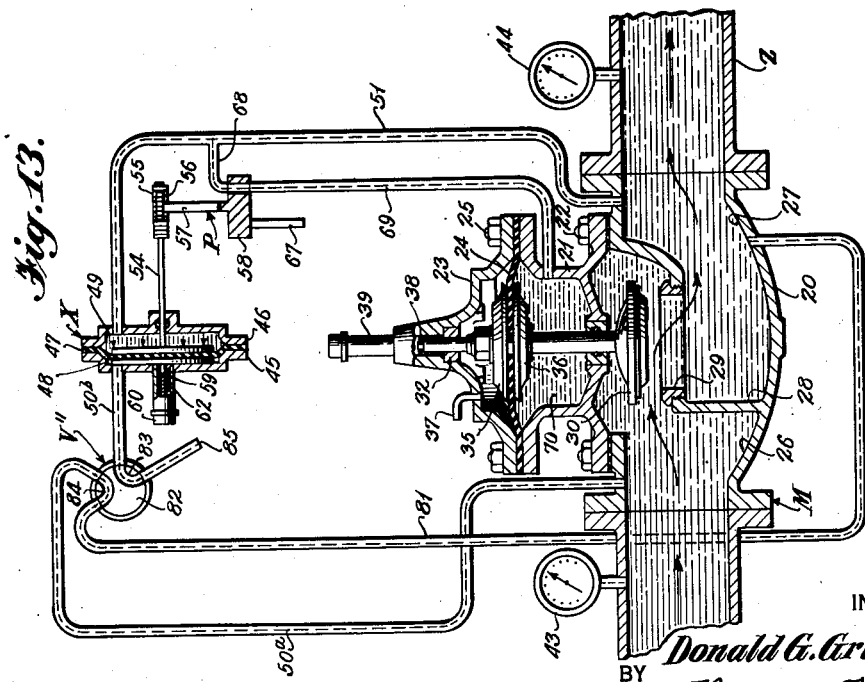
INVENTOR
Donald G. Griswold
BY Bacon + Thomas
ATTORNEYS

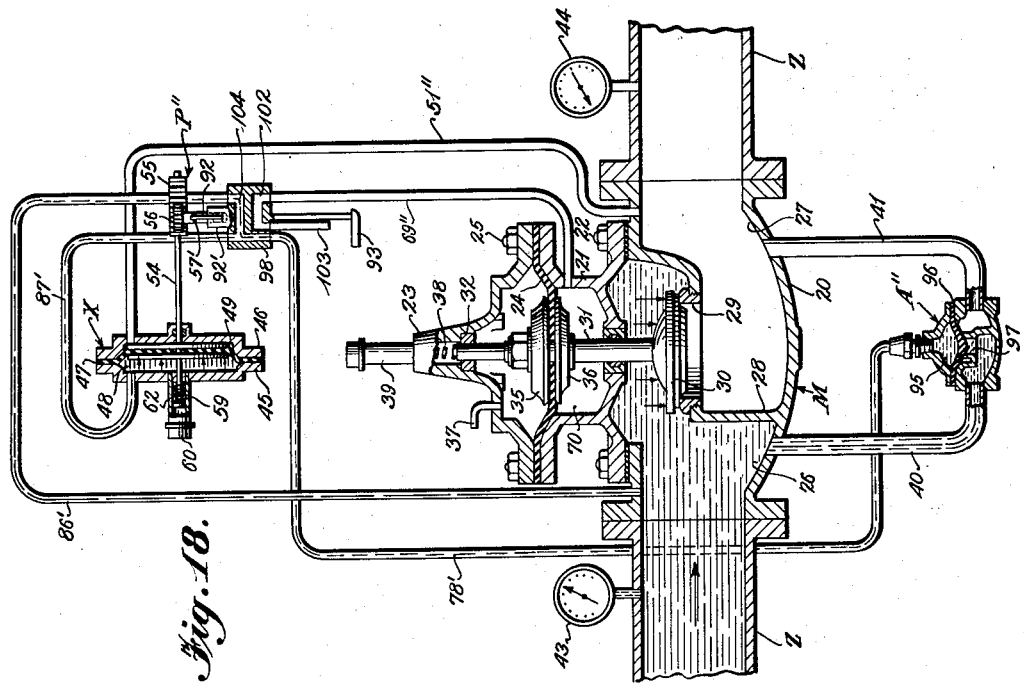

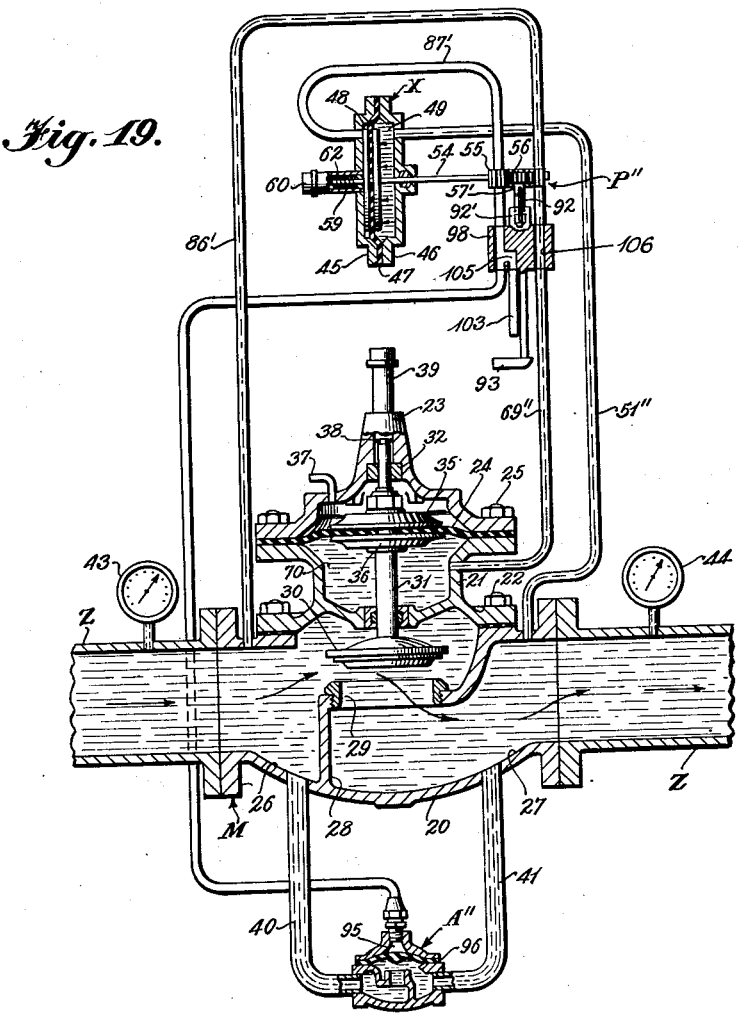

Patented Aug. 25, 1953

2,649,773

UNITED STATES PATENT OFFICE 2,649,773

DIFFERENTIAL PRESSURE OPERATED VALVE

Donald G. Griswold, Alhambra, Calif.

Application March 27, 1946, Serial No. 657,429

26 Claims. (Cl. 137—469)

1

The present invention relates to valves, and more particularly to valves constructed to automatically close in accordance with the differential pressure across the inlet and outlet thereof. More specifically, the invention relates to valves functioning in the nature of excess flow control valves, that is, valves which automatically close when the pressure differential thereacross exceeds a given amount or when the rate of flow therethrough exceeds a desired normal rate of flow.

Valves constructed in accordance with the principles of the present invention are especially adapted for use in installations designed to handle liquefied petroleum gases, such as butane and propane, although the invention manifestly is not limited to such use, and is generally applicable to the handling of liquids and gases in general.

Valves embodying the principles of the present invention are particularly adapted for use as safety means in dispensing systems handling liquefied petroleum gases, etc. The liquefied gases are usually stored in spherical tanks under considerable pressure. In the case of butane, the pressure in the storage tank is usually about 45 lbs. per square inch and in the case of propane, the storage tank pressure is considerably higher, approximately 180 lbs. per square inch. There have been numerous instances in the past when a discharge line from the storage tank has broken and serious fires and explosions have resulted, causing considerable property damage and loss of life.

The present invention is designed to eliminate such fires and losses, and in accordance therewith, one of the valves (hereinafter referred to as the main valve) disclosed herein is preferably connected to the base portion of the storage tank itself, and arranged so that the main valve is normally held open by the pressure of the fluid flowing from the tank itself, during the transfer of the liquid from the storage tank to a tank truck, tank car, etc. However, the present main valve can be connected in any pipeline where it is desired to cut off all flow in the event of a leak or a break in the pipeline. In one operative form of the present invention, the rate of flow through the main valve is 200 gallons per minute, and at which rate the pressure drop across the main valve is only approximately ¼ of a pound per square inch. The arrangement is such that should the pipeline, between the main valve and point of delivery, break or seriously leak, the flow rate would be accelerated

2 to a point beyond the normal flow rate of 200 gallons per minute, in which event the main valve would immediately close automatically under the control of a pressure-responsive device actuated in accordance with the pressure drop across the main valve. The pressure-responsive device actuates a pilot valve which controls the supply and exhaust of operating fluid to the main valve. The pressure-responsive device may be adjustable, or preset, so that if the pipeline breaks and the flow rate is accelerated to, say about 270 gallons per minute, the pressure drop across the main valve caused by this greater flow rate would be about ½ lb. per square inch, which would be ample to actuate the pressure-responsive device to cause the pilot valve to change position and effect closing of the main valve. Main valves as large as six inches have been closed by the present control device within the extremely short period of five seconds, thus insuring great safety and indicating remarkable sensitivity of control.

As a further safety precaution, the pilot valve and pressure-responsive device are preferably enclosed in a metal housing packed with asbestos or other fire resistant material to protect the same in the event that any flames should reach the vicinity of the main valve. Also, the main valve is designed so that the flow is in the same direction as the travel of the valve disc in moving toward its seat. Hence, whenever the main valve is automatically closed, full tank pressure is applied to the top surface of the valve disc to hold the same against its seat. This is a distinct advantage, for in the event that fluid leaking from the pipeline should catch fire the main valve will close and remain tightly closed, preventing the discharge of any large volume of inflammable liquid from the storage sphere.

A further safety feature of the present control means includes provision for requiring manual operation of one or more elements of the control means before the main valve can be placed back into service. This feature insures that the main valve will not open by itself, and will not open until after the break in the pipeline has been repaired and the manually operable element or elements has or have been deliberately actuated to place the main valve back into service.

Accordingly, the principal object of the invention is to provide a main valve and control means therefor adapted to safely handle highly inflammable liquids and/or gases.

Another object of the invention is to provide a main valve for controlling the flow of liquids and/or gases which will automatically close when a given pressure differential is established across said main valve or the flow through said main valve exceeds a predetermined rate.

A further object of the invention is to provide a valve and control means for controlling the flow of inflammable liquids and/or gases, constructed so that once the valve has been automatically closed as the result of a break or leak in the pipeline, the control means must be manually actuated to place the valve back into service.

A further object of the invention is to provide means for increasing the sensitivity of a pressure-responsive control device, at will.

A still further object of the invention is to provide means operable at will to balance the fluid pressures upon the opposite sides of a valve.

Other objects and features of the invention will be apparent from the following description taken in conjunction with the accompanying drawings, in which:

Fig. 5 is a view similar to Fig. 4 but showing the parts in the relative positions that they assume at the time that the main valve starts to close;

Fig. 6 is a diagrammatic view similar to Fig. 4, but showing the main valve and the parts of the control mechanism in the positions they assume when the main valve is fully closed;

Fig. 7 is a diagrammatic view similar to Fig. 4, but illustrating the relation of the parts of the main valve and the control means to place the main valve back into service;

Figure 16:
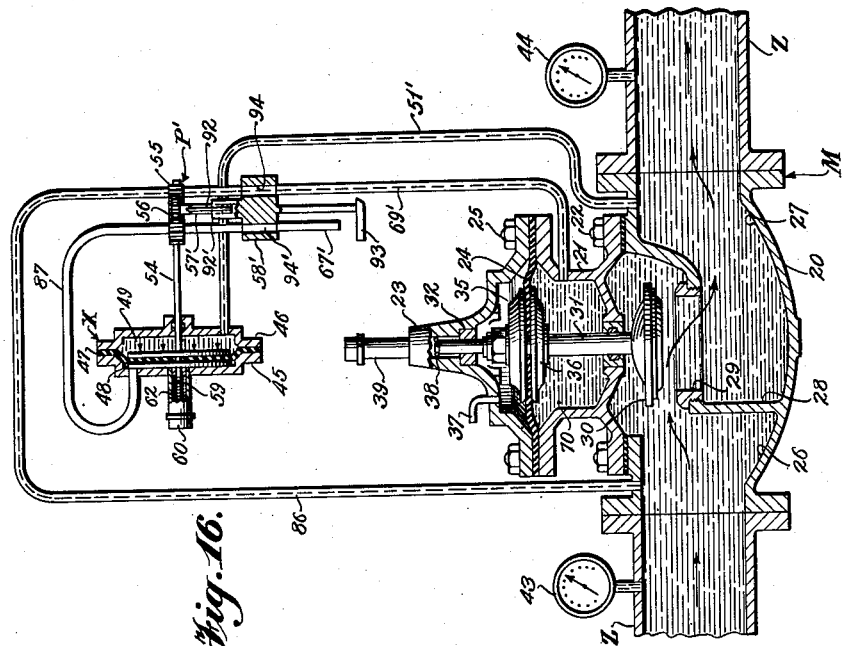
Figure 15:
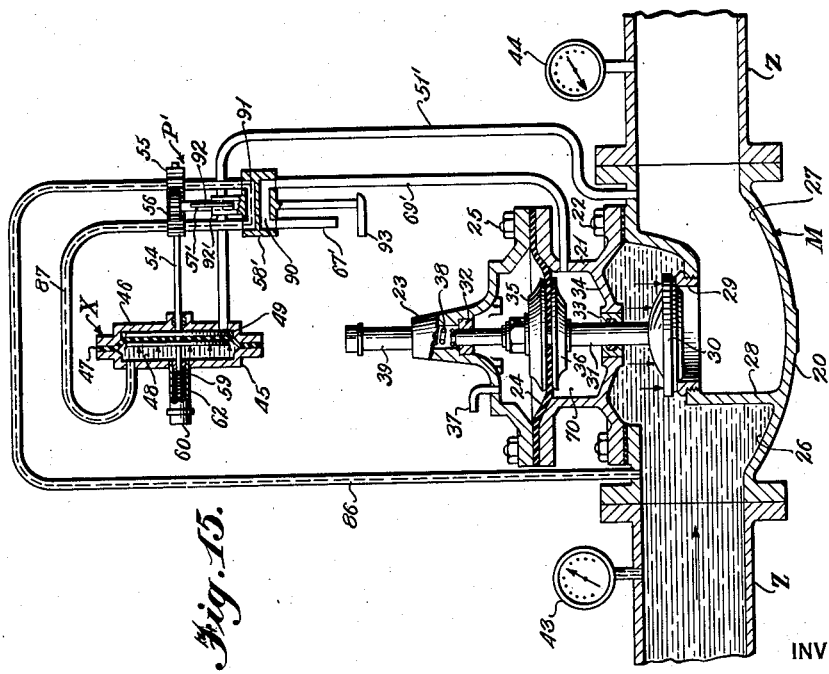

Figs. 8 to 10, inclusive, are diagrammatic views illustrating a modified form of the main valve and control means in which the manually operated by-pass valve of Figs. 1 to 7, inclusive, is replaced by a fluid pressure operated by-pass valve, and the manually operated vent valve is replaced by a manually operated pilot valve arranged so that it controls the fluid pressure operated by-pass valve;

Figs. 11 to 13, inclusive, are diagrammatic views illustrating another form of main valve and control means therefor in which the by-pass and vent valves of Figs. 1 to 7, inclusive, are omitted and their functions are accomplished by a single manually operated pilot valve;

Figs. 14 to 16, inclusive, diagrammatically illustrate still another form of main valve and control means further simplified by omitting the by-pass valve and vent valve of Figs. 1 to 7, inclusive, and incorporating their functions through a dual purpose pilot valve which is arranged to be automatically operated by the pressure-responsive device to effect closing of the main valve and manually operated to effect opening of said main valve to place said main valve back into service; and Figs. 17 to 19, inclusive, are diagrammatic views illustrating a still further form of main valve and control means including a fluid pressure operated by-pass valve and a combined automatically and manually operated pilot valve.

Referring to Figs. 1 to 7, inclusive, of the drawings, the main valve is generally indicated by the letter M, the manually operable by-pass valve by the letter A, the pilot valve by the letter P, the pressure-responsive means for actuating said pilot valve by the letter X, and the manually operable vent valve by the letter V. The main valve M is connected to the outlet of a storage tank (not shown) or in a pipeline generally identified by the letter Z and in which it is desired to control the rate of flow.

The main valve M includes a body 20, a spool-like section 21 secured to the body by bolts 22, a cover 23, a diaphragm 24 interposed between the section 21 and cover 23, and bolts 25 securing the cover 23 and diaphragm 24 to the section 21. The valve body 20 includes an inlet chamber 26 and an outlet chamber 27 separated by a partition 28. The partition 28 carries an annular seat 29 adapted to cooperate with a valve disc 30 carried by the lower end of a stem 31. The stem 31 is guided at its upper end by a bushing 32 carried by the cover 23 and is guided at its lower end by a bushing 33 carried by a transverse wall 34 at the lower end of the section 21. The stem 31 carries supporting plates 35 and 36 disposed upon opposite sides of the diaphragm 24. The space in the cover 23 above the diaphragm 24 is vented to the atmosphere by a pipe 37. A compression spring 38 is disposed above the stem 36 and is received in a housing 39 mounted upon the cover 23. The action of the spring 38 is such that it tends to urge the stem 31 downwardly at all times, thereby continually urging the valve disc 30 toward the seat 29.

The inlet side of the by-pass valve A is connected by a conduit 40 with the inlet chamber 26 of the main valve M, and the outlet side of the by-pass valve A is connected by a conduit 41 with the outlet chamber 27 of said main valve. The by-pass valve A is of conventional construction or any suitable construction and includes the usual handwheel 42 adapted, in the present case, to establish or interrupt communication between the inlet chamber 26 and the outlet chamber 27 of the main valve M.

Pressure gauges 43 and 44 may be connected in the pipeline Z at the inlet and outlet sides, respectively, of the main valve M, wherefrom the pressure differential across said main valve may be noted.

The pressure-responsive device X includes a housing comprising sections 45 and 46 with a diaphragm 47 disposed therebetween. The housing sections 45 and 46 and diaphragm 47 may be secured together in any suitable manner as by means of screws (not shown).

The housing section 45 contains a chamber 48 on one side of the diaphragm and the housing section 46 contains a chamber 49 on the opposite side of said diaphragm. A conduit 50 establishes communication between the inlet chamber 26 of the main valve M and the chamber 48 of the pressure-responsive device X, and a conduit 51 establishes communication between the outlet chamber 27 of said main valve and the chamber 49 of said pressure-responsive device.

Figure 4:
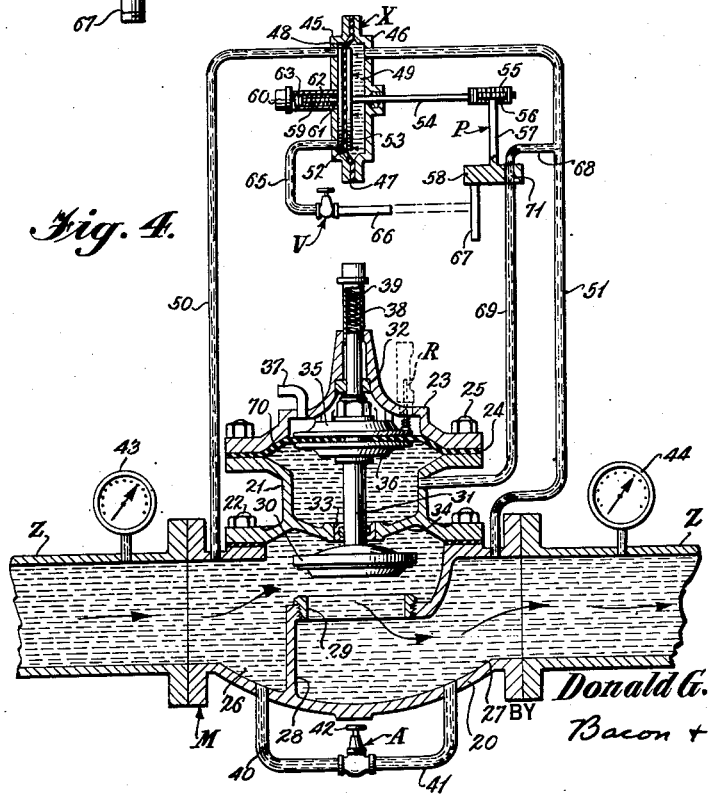
Fig. 4 is a diagrammatic view illustrating the relative position of the parts of the main valve and the control means during normal flow.

The diaphragm 47 has a supporting plate 52 on one side thereof disposed in the chamber 48 and a second supporting plate 53 on the opposite side thereof in the chamber 49. The diaphragm 47 and the supporting plates 52 and 53 are suitably secured to a rod 54 having a gear rack 55 at one end thereof. The gear rack 55 meshes with a pinion 56 for driving a shaft 57 having a pilot disc 58 drivingly connected to the lower end thereof. The rod 54 includes an extension 59 which projects into a casing 60 carried by the housing section 45. The casing 60 has a guide 61 for the rod extension 59 at its inner end, which also serves as an abutment for one end of a compression spring 62. The opposite end of the spring 62 engages an enlargement 63 (Fig. 4) on the end of the rod extension 59. The compression spring 62 is thus arranged so that it continuously exerts force upon the rod 54 tending to flex the diaphragm 47 toward the left as illustrated in Fig. 4. In other words, the spring 62 acts upon the diaphragm 47 in the same direction as the outlet pressure in chamber 49.

The inlet side of the manually operated vent valve V is connected with the chamber 48 of the pressure-responsive device X by a conduit 65. The outlet side of the vent valve V is connected with one end of a conduit 66 and the opposite end of said conduit may be connected with a suitable drain, or with a tube 67 serving as a drain for exhaust fluid from the pilot valve P, as indicated by the dot-and-dash lines in Fig. 4. The conduit 66 and/or drain tube 67 discharge into the atmosphere when non-inflammable fluids are being handled, but are preferably connected with a drain or tank (not shown) under relatively low pressure when inflammable fluids are being handled in order to avoid a fire hazard. A conduit 68 (Figs. 4 to 7) establishes communication between the conduit 51 and the pilot valve P, and a conduit 69 establishes communication between a pressure chamber 70 in the housing section 21 at the lower side of the diaphragm 24 of the main valve M and said pilot valve.

The operation of the main valve M and control means X, P, A and V will be best understood by reference to the diagrammatic illustrations of Figs. 4 to 7. Thus, Fig. 4 diagrammatically illustrates the main valve M, the pressure-responsive device X and the pilot valve P, in the positions they assume during normal flow through the valve. It will be noted at this time that the manually operated by-pass valve A is closed, and that the manually operated vent valve V is also closed. It will be understood that the conduit 50 communicates the pressure at the inlet side 26 of the main valve M to the chamber 48 of the pressure-responsive device X, and that the conduit 51 communicates the pressure at the outlet side 27 of said main valve to the chamber 49 of said pressure-responsive device. It will be further understood that the spring 62 acts to supplement the pressure in the chamber 49 by urging the rod 54 toward the left. Accordingly, during normal operation, the pressure drop through the main valve M is usually less than ½ lb. per square inch, and, therefore, the gauges 43 and 44 show practically the same reading. Also, under such slight pressure drop, the spring 62 can be very light and still be able to hold the diaphragm 47 flexed toward the left. Hence, the pilot disc 58 assumes the position shown in Fig. 4. The main valve M is now open by virtue of pressure from the outlet chamber 27 of said main valve being communicated to the diaphragm chamber 70 through the conduits 51 and 68, a pressure port 71 in the pilot disc 58, and the conduit 69. The pressure fluid thus introduced into the chamber 70 acts upon the underside of the diaphragm 24 to raise the stem 31 against the force of the spring 38 to lift the disc 30 from its seat 29. Accordingly, the main valve M is positively held open and flow through the pipeline Z and said main valve occurs in the direction indicated by the arrows in Fig. 4.

Assuming now that a break or leak has occurred in the pipeline Z at a point beyond the main valve M so that a pressure drop occurs in the outlet chamber 27 and in said pipeline, the gauge 44 will then indicate a pressure lower than that indicated by the gauge 43, as diagrammatically illustrated in Fig. 5. The drop in pressure in the outlet chamber 27 of the main valve will, of course, be communicated to the chamber 49 of the pressure-responsive device X through the conduit 51, so that the excess pressure in the inlet chamber 26 of the main valve M is communicated through the conduit 50 to the chamber 48 of the pressure-responsive device X, overcoming the resistance to flexing of the diaphragm 47 offered by the spring 62, and flexing said diaphragm toward the right, as shown in Fig. 5. Flexing of the diaphragm 47, as described, will shift the rod 54 toward the right, and the gear rack 55 carried thereby will effect rotation of the pilot disc 58 a corresponding amount through the interconnection therewith by the pinion 53 and the shaft 57. Rotation of the pilot disc 58 positions an exhaust port 72 so that it establishes communication between the conduit 69 and the pilot drain tube 67, whereby spent operating fluid is exhaused from the pressure chamber 70 of the main valve, permitting the spring 38 to move the stem 31 downwardly and position the valve disc 30 upon its seat 29 to shut off flow through the main valve M. Fig. 5 illustrates the main valve M in the act of closing, and Fig. 6 illustrates the main valve M in its fully closed position with the pressure at the inlet side of the valve acting upon the upper surface of the valve disc 30 to hold said valve disc tightly against its seat 29.

The main valve M will remain closed until the control means for placing said valve back into service is deliberately and manually actuated. Reopening of the main valve M is effected by balancing the pressures in the inlet chamber 26 and the outlet chamber 27. Such balancing of pressures is obtained by manually opening the by-pass valve A while the main valve M is still closed. Normally, the main valve M is allowed to remain closed until the break or leak in the pipeline Z has been repaired. After the necessary repair has been made, the by-pass valve A is manually opened and communication is established between the inlet chamber 26 and the outlet chamber 27 of the main valve M through the conduits 40 and 41, as diagrammatically illustrated in Fig. 7. As the pressure builds up on the outlet side 27 of the main valve M it is communicated through the conduit 51 to the chamber 49 of the pressure-responsive device X and supplements the force of the spring 62 to flex the diaphragm 47 toward the left and effect the return of the pilot disc 58 to its initial position. Quicker operation of the pressure-responsive device X is obtained by opening the vent valve V to permit the fluid in the chamber 48 of the pressure-responsive device X to drain to the atmosphere or to any zone of lower pressure through at least the conduits 65 and 66. The vent valve V thus makes it possible for the pressure-responsive device to operate on extremely low pressure differentials on the inlet and outlet sides of the main valve M. However, the vent valve V is not absolutely essential to the successful operation of the present invention for the reason that, when the by-pass valve A is manually opened, the pressures will quickly equalize on the opposite sides of the main valve M and be transmitted through the conduits 50 and 51 to the chambers 48 and 49 on the opposite sides of the diaphragm 47 of the pressure-responsive device X. It will be apparent that the pressures in the latter chambers will also become quickly equalized, thereby enabling the spring 62 to flex the diaphragm 47 back toward the left, as shown in Fig. 7. It is to be understood, however, that the vent valve V is highly desirable because it opens the chamber 48 directly to the atmosphere or a zone of relatively low pressure, thereby enabling an excess of pressure to be built up in the chamber 49 of the pressure-responsive device X, which will effect quick operation of the pilot valve P and restore the pilot disc 58 to the same position that it originally occupied during normal operation. Sensitive operation of the pressure-responsive device X is further assured by the fact that the conduit 50 is smaller in diameter than the conduits 65 and 66, as actually shown in Fig. 1. Thus, in one operative construction of the invention, the conduit 50 is ¼ inch in diameter and the vent conduits 65 and 66 are ⅜ inch in diameter, so that fluid can be vented from the chamber 48 at a faster rate than it can be supplied.

Upon restoration of the pilot disc 58 to its normal position, operating fluid under pressure will be conducted from the conduit 51 through the conduit 68, pilot port 71, and conduit 69 to the pressure chamber 70 at the lower side of the diaphragm 24, to effect upward flexing of said diaphragm and the lifting of the disc 30 from its seat 29 to permit flow through the main valve M. As soon as the pilot disc 58 has been positioned to admit operating fluid into the pressure chamber 70, and the main valve M starts to open, and this may be indicated by a conventional indicator rod R, the vent valve V is manually closed. The by-pass valve A is also manually closed after the valve M assumes normal operation, inasmuch as it is no longer necessary for said by-pass valve to be open, and moreover, the by-pass valve A must be closed to restore the main valve M to automatic control by the pressure-responsive device X.

In choosing the proper size main valve for any given installation, very careful consideration is given to the factor of resistance to flow, and a main valve of the proper size is chosen which will not result in excessive flow resistance. The selection of such a main valve is simply a matter of computing the maximum demand through the line with which the main valve is to be connected, and which maximum demand is frequently set and predetermined by a pump or some other means of producing flow, and the resistance through the main valve itself under any rate of flow as determined by the normal demand. In any event, the selected main valve should not be such as to require a high pressure differential to actuate the pressure-responsive device X. Otherwise, the necessary sensitive operation of the control to effect quick closing of the main valve will not be obtained. Also, the spring 62 is chosen to provide the desire sensitive operation of the pressure-responsive control X. Incidentally, the spring 62 may be of a preselected size, or may be associated with an adjusting device (not shown) to vary the spring resistance, to obtain the desired sensitivity.

In one operative embodiment of the invention, the spring 62 was a half pound spring, the main valve and pipeline were six inches to accommodate a flow of liquefied butane at the rate of 200 gallons per minute from a shortage tank under a pressure of about 45 lbs. per square inch. The by-pass valve A for such installation was a ¾ inch valve, and the vent valve V, of course, was a ⅜ inch valve since it is connected with a ⅜ inch vent conduit 65.

Figure 1:
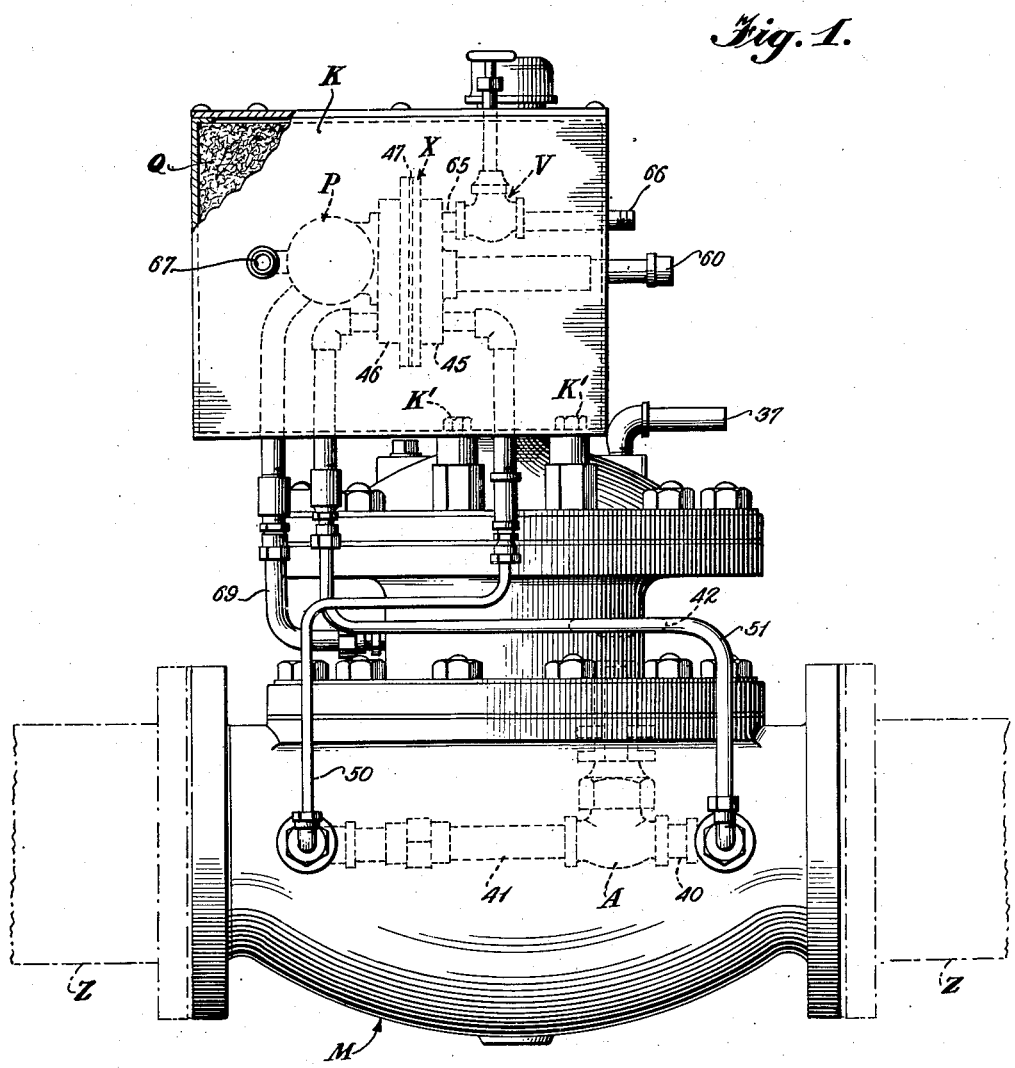
Fig. 1 is a front elevational view of a main valve and control means embodying the principles of the present invention and including a manually operable by-pass valve for the main valve and a manually operable vent valve for one side of the pressure-responsive device.
Figure 2:
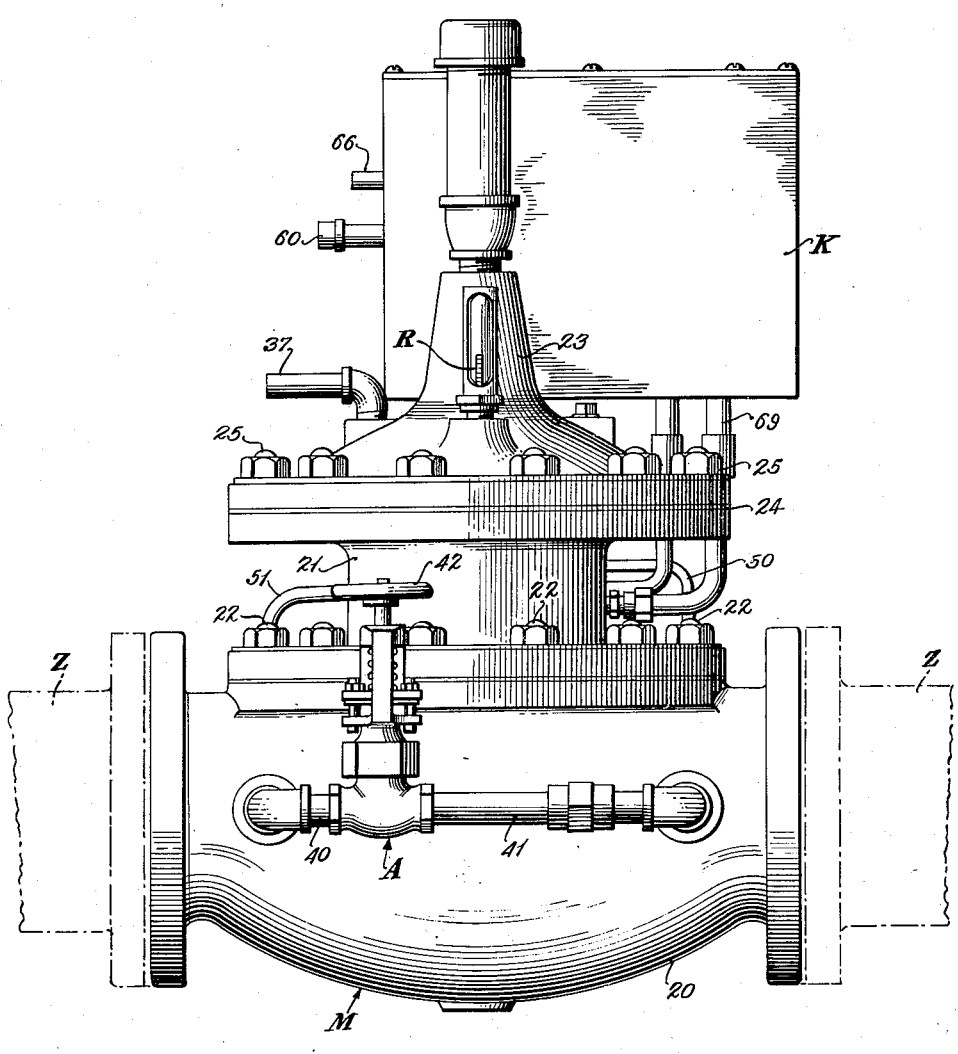
Fig. 2 is a rear elevation of the apparatus shown in Fig. 1.
Figure 3:
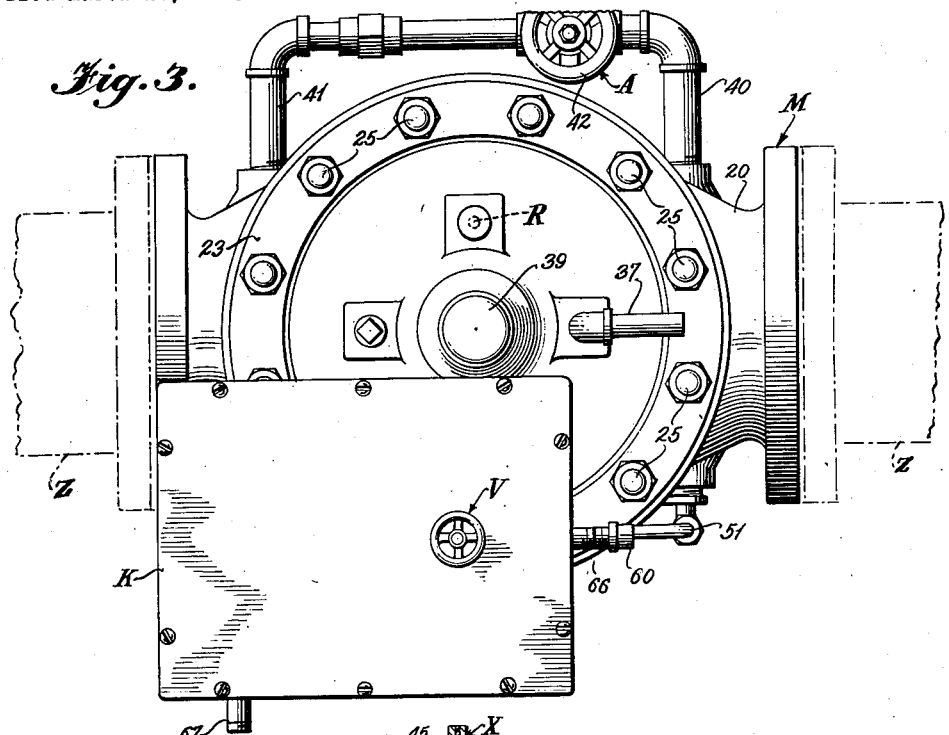
Fig. 3 is a plan view of the apparatus shown in Fig. 1.

In order to protect the pressure-responsive device X, the pilot valve P and the vent valve V from fire, the same are enclosed in a steel casing K, filled with fire resistant material Q, as best shown in Fig. 1. The casing K is mounted upon the main valve M by bolts K'.

Figs. 8 to 19, inclusive, illustrate additional embodiments of the invention and, in the interest of clarity and brevity, the parts thereof corresponding to those already described will be identified by the same reference characters.

It will be noted that the main valve and control means therefor shown in Figs. 8 to 10, inclusive, differ from the previously described construction of Figs. 1 to 7, inclusive, in the respects that, the manually operated by-pass valve A has been replaced by a fluid pressure operated by-pass valve A', and the manually operated vent valve V has been replaced by a manually operated pilot valve V' which serves as a vent for the chamber 48 and also as a control for the by-pass valve A'. It will be further noted that a conduit 50' establishes communication between the inlet 26 of the main valve M and the pilot valve V'. A second or vent conduit 50'' establishes communication between the pilot valve V' and the chamber 48 of the pressure-responsive device X. A pilot disc 73 of the pilot valve V' is provided with a port 74 which, when in the position shown in Fig. 8, establishes communication between the conduits 50' and 50'' and hence between the inlet chamber 26 of the main valve M and the chamber 48 of the pressure-responsive device X.

The by-pass valve A' is of conventional or any suitable construction and includes a diaphragm 75 and a pressure chamber 76 arranged above said diaphragm, said diaphragm being adapted to be urged toward a seat 77 by pressure fluid in the chamber 76. A conduit 78 establishes communication between the pressure chamber 76 and the pilot valve V'. As shown in Fig. 8, a port 79 in the pilot disc 73 establishes communication between the conduits 50' and 78, so that during normal operation of the main valve M, the by-pass valve A' is maintained closed by fluid pressure from the inlet chamber 26 of the main valve M.

So long as the pressure on the gauges 43 and 44 of Fig. 8 are substantially equal, the main valve M will be held open by pressure fluid in the diaphragm pressure chamber 70 acting against the lower side of the diaphragm 24, as previously explained in connection with Figs. 4 to 7, and normal flow will occur through the main valve M in the direction indicated by the arrows. In the event of a break or leak in the line Z on the outlet side of the main valve M, the gauge 44 will indicate the pressure drop, and the pressure-responsive device X will function in the same manner previously described to flex the diaphragm 47 toward the right and position the pilot disc 58 of the pilot valve P in the position shown in Fig. 9 to effect the exhaust of fluid from the pressure chamber 70 through the conduit 69, exhaust port 72 of the pilot disc 58 and the drain tube 67 of the pilot valve P. The main valve M will then be closed and held closed by the spring 38 and the pressure of the fluid in the inlet chamber 26 will act upon the upper side of the valve disc 30 holding the same down against its seat 29.

Assuming that the leak or break in the pipeline Z has been repaired and it is desired to place the main valve M back into service, the pilot disc 73 of the pilot valve V' is then manually rotated to the position shown in Fig. 10, wherefrom it will be noted that the port 74 has established communication between the conduit 78 and a drain tube 80 to vent the pressure chamber 76 of the bypass valve A' to the atmosphere or zone of lower pressure to permit opening of said by-pass valve, and that the port 79 of said pilot disc has simultaneously established communication between the conduit 50'' and the drain tube 80 to reduce the pressure in the chamber 48 of the pressure-responsive device X. The opening of the by-pass valve A', of course, establishes communication between the inlet chamber 26 and the outlet chamber 27 of the main valve M in order to equalize the pressures therein. The venting of the chamber 48 of the pressure-responsive device X to a zone of lower pressure makes it possible for pressure to quickly build up in the chamber 49 of the pressure-responsive device to effect flexing of the diaphragm 47 toward the left (see Fig. 10), to thus restore the pilot disc 58 to the same position which it previously occupied during normal flow, so that operating fluid under pressure can be admitted into the diaphragm chamber 70 to effect positive lifting of the valve disc 30 from its seat 29 to effect opening of the main valve M, all as previously described.

It will be apparent that the device shown in Figs. 8 to 10 is simpler than the device shown in Figs. 1 to 7, inclusive, in the respects at least that separate manual operation of the by-pass valve A' has been eliminated, and in that the amount of fluid discharged during the venting of the chamber 48 of the pressure-responsive device X is limited to the fluid contained in said chamber, and no fluid is bled from the inlet side of the main valve M during the venting of the pressure-responsive device X.

Figs. 11 to 13, inclusive, illustrate a further embodiment of the invention which is simpler than those previously described herein, in the respect at least that a single pilot valve V'' is arranged to perform the functions of both a by-pass for the main valve M and a vent for the pressure-responsive device X.

A conduit 50ª connects the inlet chamber 26 of the main valve M with the pilot valve V''. A conduit 50ᵇ connects the pilot valve V'' with the chamber 48 of the pressure-responsive device X. A conduit 81 connects the pilot valve V'' with the outlet chamber 27 of the main valve M.

The operation of the device shown in Figs. 11 to 13, inclusive, during normal flow and in the event of a leak or break in the pipeline Z, is the same as that for the devices shown in Figs. 1 to 10, inclusive. However, the main valve M. shown in Figs. 11 to 13, inclusive, is reopened or placed back into service solely by manual actuation of the pilot valve V''. This pilot valve includes a disc 82 provided with ports 83 and 84. During normal flow, the pilot disc 82 is positioned so that the port 83 establishes communication between the conduits 50ª and 50ᵇ (Fig. 11), thereby communicating the pressure in the inlet chamber 26 of the main valve M to the chamber 48 of the pressure-responsive device X. This pressure is opposed, as in the previously described devices, by the spring 62 and the pressure in the outlet chamber 27 of the main valve communicated through the conduit 51 to the chamber 49 of the pressure-responsive device X. When a break or leak in the pipeline Z occurs, the pressure-responsive device X automatically effects rotation of the pilot disc 58 to the position shown in Fig. 12 to effect closing of the main valve M, in exactly the same manner previously described. However, the pressure-responsive device X has no effect upon the manually actuated pilot valve V''. Hence, the main valve M will remain closed until the pilot valve V'' has the pilot disc 82 thereof manually rotated to the position shown in Fig. 13. It will be noted from this figure that the port 83 now establishes communication between the vent conduit 50ᵇ and a drain tube 85 of the pilot valve V''. Accordingly, the chamber 48 of the pressure-responsive device X will be vented to the atmosphere or a zone of lower pressure through the drain tube 85. At the same time, the port 84 of the pilot disc 82 establishes communication between the conduits 50ª and 81 so that pressure fluid from the inlet chamber 26 of the main valve M can then flow into the outlet chamber 27 of said main valve and equalize the fluid pressures on the opposite sides of said main valve. The venting of the chamber 48 of the pressure-responsive device X through the drain tube 85 permits an excess of pressure to quickly build up in the chamber 49 of said device so that the diaphragm 47 is quickly flexed toward the left, as viewed in Fig. 13, thereby restoring the pilot disc 58 to its original position corresponding to normal flow through the main valve M. Such positioning of the pilot disc 58, as previously explained, will admit operating fluid under pressure into the diaphragm chamber 70 to positively lift the valve disc 30 from its seat 29 to effect opening of the main valve M. In order to place the main valve M back under the control of the pressure-responsive device X, the pilot disc 82 of the pilot valve V'' is then manually rotated from the position shown in Fig. 13 to that illustrated in Fig. 11, so that the pressure at the inlet side 26 of the main valve M is then communicated to the chamber 48 in opposition to the pressure in the chamber 49 and the force exerted by the spring 62 tending to flex the diaphragm 47 toward the left. It will be understood, of course, that the pilot valve V'' will not be manually actuated, in any event, until after the leak or break in the pipeline Z has been repaired.

Figs. 14 to 16, inclusive, diagrammatically illustrate a device which differs from all of the previously described main valves and control means therefor, in that a combined automatically and manually operable pilot valve P' takes the place of the pilot valve P and also eliminates the necessity for other valve means to effect venting of the pressure-responsive device X to the atmosphere and the by-passing of fluid from the inlet chamber 26 to the outlet chamber 27 of the main valve M when it is desired to place the main valve M back into service. Thus, the pilot valve P' is connected with the inlet chamber 26 of the main valve M by a conduit 86, and a conduit 87 establishes communication between the chamber 48 of the pressure-responsive device X and said pilot valve. A conduit 69' establishes communication between the diaphragm chamber 70 of the main valve M and the pilot valve P', and a conduit 51' establishes communication between the outlet chamber 27 of the main valve M and chamber 49 of the pressure-responsive device X.

The pilot valve P' includes a disc 58' provided with ports 88 and 89, which, when in the position shown in Fig. 14, condition the main valve M for normal flow therethrough. Thus, fluid for holding the valve disc 30 raised from its seat 29 is communicated to the diaphragm chamber 70 from the inlet chamber 26 of the main valve M through the conduit 86, port 88 and conduit 69'. At the same time, the pressure from the inlet chamber 26 of the main valve M is communicated to the chamber 48 of the pressure-responsive device X through the conduit 86, port 89 and conduit 87. Hence, the main valve M is now held in its open position under automatic control by the pressure-responsive device X. In the event of a leak or a break in the pipeline Z on the outlet side of the main valve M, the pressure on said outlet side will drop so that the excess of pressure in the chamber 48 will flex the diaphragm 47 toward the right, rotating the pilot disc 58' from the position shown in Fig. 14 to that shown in Fig. 15. It will be noted from Fig. 15 that an exhaust port 90 in the pilot disc 58' has now established communication between the conduit 69' and a drain conduit 67' of the pilot valve P', so that spent operating fluid is exhausted from the diaphragm chamber 70 of the main valve M, thereby permitting the spring 32 to force the valve disc 30 toward its seat 29. The pressure in the inlet chamber 26 of the main valve M acts upon the upper surface of the valve disc 30 and positively holds the same against its seat 29 to maintain the main valve M tightly closed. At the same time, a port 91 in the pilot disc 58' establishes communication between the conduits 86 and 87 so that the pressure in the inlet chamber 26 of the main valve M continues to be transmitted to the chamber 48 of the pressure-responsive device X. Inasmuch as the pressure in the outlet chamber 27 of the main valve M has dropped, there will be insufficient pressure in the conduit 51', and in the chamber 49 of the pressure-responsive device X, to maintain the diaphragm 47 flexed toward the left, so that said diaphragm will now be flexed toward the right to position the pilot disc 58' in the position diagrammatically illustrated in Fig. 15. The main valve M shown in this figure, therefore, remains closed until the pilot disc 58' is manually actuated, after the break or leak in the pipeline Z has been repaired, to position the same as indicated in Fig. 16. The actuation of the pilot disc 58', independently of the pressure-responsive device X, can readily be achieved by a yieldable or lost-motion driving connection between said pilot disc 58' and its driving shaft 57'. For example, a spring 92 may have one end thereof connected to the shaft 57' and its other end connected to a hub 92' on the pilot disc 58'. A manually operable handle 93 is non-rotatably connected with the pilot disc 58'. The spring 92 is stiff enough to require the pilot disc 58' to rotate with the shaft 57', but is also yieldable to allow turning of said pilot disc by the handle 93 without rotating the shaft 57'. Hence, when the pilot disc 58' is manually turned by the handle 93 to the position shown in Fig. 16, a port 94 establishes communication between the conduits 86 and 69' and operating fluid under pressure will be admitted into the diaphragm chamber 70 through the conduit 69' to positively lift the valve disc 30 from its seat 29 so that normal flow through the valve M can be resumed. Simultaneously, a port 94' in the pilot disc 58' will have established communication between the conduit 87 and the drain tube 67' to vent the chamber 48 of the pressure-responsive device X to the atmosphere and thereby permit the diaphragm 47 to be flexed toward the left, as shown in Fig. 16. Such flexing of the diaphragm 47 has no effect upon the pilot disc 58' because of the yieldable or lost-motion driving connection previously referred to. After normal pressures and the desired rate of flow have been restored in the pipeline Z, the handle 93 is released and the pilot disc 58' is returned by the spring 92 to its initial position indicated in Fig. 14 and restored for automatic control by the pressure-responsive device X.

The further embodiment of the main valve and control means shown in Figs. 17 to 19, inclusive, is somewhat similar to that shown in Figs. 8 to 10, in that it includes a fluid pressure operated by-pass valve A'' for balancing the pressures in the inlet chamber 26 and outlet chamber 27 of the main valve M. However, in Figs. 17 to 19, a combined manually and automatically operated pilot valve P'' replaces the fully automatically operated pilot valve P and the manually operated pilot valve V, of Figs. 8 to 10. Thus, in Figs. 17 to 19, inclusive, a conduit 86' establishes communication between the inlet chamber 26 of the main valve M and the pilot valve P''. A conduit 87' establishes communication between the chamber 48 of the pressure-responsive device X and the pilot valve P'' and a conduit 78' establishes communication between said pilot valve and a diaphragm pressure chamber 95 above a diaphragm 96 in the by-pass valve A''. The pressure of fluid in the chamber 95 urges the diaphragm 96 toward its seat 97. A conduit 69'' connects the pilot valve P'' with the diaphragm chamber 70 of the main valve M.

The pilot valve P'', includes a pilot disc 98, which during normal flow through the main valve M assumes the position indicated in Fig. 17. It will be noted from this figure, that a port 99 in the pilot disc 98 interconnects the conduits 86' and 69'' so that operating fluid under pressure passes from the inlet chamber 26 of the main valve through the conduit 86', port 99 and conduit 69'' into the diaphragm chamber 70 to maintain the valve disc 30 raised from its seat 29. It will be further noted that the pilot disc 98 includes a port 100 connected with the port 99 by a transverse port 101. Accordingly, a portion of the fluid pressure from the conduit 86' is diverted through the port 101 into port 100 and then into the conduits 87' and 78'. The fluid admitted into the conduit 78' is delivered thereby to the diaphragm chamber 95 in the by-pass valve A'', flexing the diaphragm 96 against its seat 97 to maintain the by-pass valve A'' closed. The fluid under pressure introduced into the conduit 87' is conducted to the chamber 48 of the pressure-responsive device X and opposes the pressure delivered to the chamber 49 of said pressure-responsive device by the conduit 51'' from the outlet chamber 27 of the main valve M. A preponderance of pressure is effective upon the diaphragm 47 flexing the same toward the left, as shown in Fig. 17.

In the event of a leak or a break in the pipeline Z on the outlet side of the main valve M, such drop in pressure will be immediately communicated to the chamber 49 of the pressure-responsive device X through the conduit 51'' so that an excess of pressure from the inlet chamber 26 of the main valve M is immediately built up in the chamber 48, resulting in flexing of the diaphragm 47 toward the right, causing the pilot disc 98 to assume the position shown in Fig. 18. It will be observed from this figure, that an exhaust port 102 in the pilot disc 98 now establishes communication between the conduit 69" and a drain tube 103, through which the spent operating fluid from the diaphragm pressure chamber 70 of the main valve is exhausted to the atmosphere or a zone of low pressure, allowing spring 32 to move the valve disc 30 toward its seat 29 to shut off flow through the main valve M. Of course, the pressure of the fluid in the inlet opening 26 of the main valve is also effective upon the upper side of the valve disc 30 to hold the same seated. Simultaneously, a port 104 in the pilot disc 98 establishes communication between the conduit 86' and the conduits 87' and 78', with the result that pressure is maintained in the diaphragm chamber 95 of the by-pass valve A" through the conduit 78', and pressure is also maintained in the chamber 48 of the pressure-responsive device X through the conduit 87', thus maintaining the main valve M closed, until such time as the leak or break in the pipeline Z has been repaired and it is desired to manually actuate the pilot P" to effect opening of the main valve M. Such manual actuation of the pilot disc 98 is effected through a yieldable or lost-motion driving connection similar to that described in connection with the pilot valve P' of Figs. 14 to 16, inclusive. Accordingly, manual actuation of the pilot disc 98 through the handle 93 results in positioning said pilot disc, as indicated in Fig. 19. As is shown in this figure, an exhaust port 105 establishes communication between the conduits 87' and 78' and the drain tube 103, so that the chamber 48 of the pressure-responsive device X and the diaphragm chamber 95 of the by-pass valve A" are vented to the atmosphere or zone of relatively low pressure, thus reducing the pressure in the chamber 48, and permitting the by-pass valve A" to be opened by the pressure in the inlet chamber 26 of the main valve M, so that fluid will flow from the chamber 26 through the pipe 40, valve A" and pipe 41 into the outlet chamber 27 to equalize the pressure across the main valve M. At the same time, a port 106 in the pilot disc 98 establishes communication between the conduit 86' and the conduit 69" so that operating fluid under pressure is supplied to the diaphragm chamber 70 of the main valve M to lift the valve disc 30 from its seat 29 and to permit flow through the main valve.

The pilot disc 98 is held in the position shown in Fig. 19 until the normal rate of flow and pressure have been restored in the pipeline Z, whereupon the handle 93 is released and the spring 92 returns said pilot disc to the position shown in Fig. 17 and restores the same to automatic operation under the control of the pressure-responsive device X.

It will be apparent from the foregoing that a main valve and control means is provided by the present invention which affords a maximum of safety in handling inflammable liquids and gases, and which is peculiarly adapted to eliminate the fire hazard resulting from a leak or a break in the pipeline through which the fluid is flowing.

While several different forms of control means for the main valve M have been disclosed herein, it will be understood that changes may be made in the details of construction thereof and in the correlation of the various elements of the control means to accomplish the same results, without departing from the spirit of the invention or the scope of the annexed claims.

I claim:

1. Fluid flow control means, comprising: a fluid pressure operated main valve including a pressure chamber and a closure element actuated to closed position by fluid under pressure in said chamber; a pressure-responsive device for controlling the supply and exhaust of operating fluid to said pressure chamber, said pressure responsive device including a diaphragm having the opposite sides thereof subject to the pressures at the inlet and outlet sides of said main valve and a pilot valve actuated by said diaphragm to effect closing of said main valve upon a predetermined drop in pressure across said main valve; and manually operable means for venting one side of said pressure-responsive device to a zone under a different pressure irrespective of the pressure on the opposite side of said diaphragm.

2. Fluid flow control means, comprising: a fluid pressure operated main valve; a pressure-responsive device having the opposite sides thereof subject to the pressures at the inlet and outlet sides of said main valve; means actuated by said pressure responsive device controlling the supply and exhaust of operating fluid to said main valve; and manually operable means for substantially simultaneously venting one side of said pressure-responsive device to a zone under a different pressure from that acting upon said one side and for effecting operation of said first-named means to exhaust operating fluid from said main valve to allow opening of said main valve.

3. Fluid flow control means, comprising: a fluid pressure operated main valve and automatic control means for effecting automatic closing of said main valve in the event of a predetermined pressure drop across said main valve, said automatic control means including a pressure-responsive device subject to the differential pressure across said main valve; means actuated by said pressure-responsive device controlling the supply and exhaust of operating fluid to said pressure operated main valve for effecting closing of said main valve; and manually controlled means for effecting venting of the side of said pressure-responsive device subject to inlet pressure to a zone of relatively low pressure and for effecting opening of said main valve.

4. Fluid flow control means, comprising: a fluid pressure operated main valve including an inlet chamber, an outlet chamber, a flow control element for controlling the flow between said chambers, and a pressure chamber for operating fluid for actuating said flow control element; and control means for said main valve for effecting automatic closing of said main valve in the event of a predetermined pressure drop thereacross, said control means including a pressure-responsive device subject to the differential pressure across said main valve; ported means actuated by said pressure-responsive device arranged to control the admission and exhaust of operating fluid to said pressure chamber of said main valve to effect opening and allow closing of said main valve; and means for reducing the pressure on the side of the pressure-responsive device subject to the pressure on the inlet side of said main valve to below that on the side thereof subject to the pressure on the outlet side of said main valve to enable said pressure-responsive device to actuate said ported means to admit operating fluid under pressure into said pressure chamber of said main valve to effect opening of said main valve.

5. Fluid flow control means, comprising: a fluid pressure operated main valve including an inlet chamber, an outlet chamber, a flow control element for controlling the flow between said chambers, means normally urging said flow control element toward closed position, and a pressure chamber for operating fluid for actuating said flow control element; and control means for said main valve for effecting automatic closing of said valve in the event of a predetermined pressure drop thereacross, said control means including a pressure-responsive device subject to the differential pressure across said main valve; ported means actuated by said pressure-responsive device arranged to control the admission and exhaust of operating fluid to said pressure chamber of said main valve to effect opening and allow closing of said main valve; and means for venting the pressure on the side of the pressure-responsive device subject to the pressure on the inlet side of said main valve to a zone of relatively low pressure to enable said pressure-responsive device to actuate said ported means to admit operating fluid under pressure into said pressure chamber of said main valve to effect opening of said main valve.

6. Fluid flow control means, comprising: a fluid pressure operated main valve including a closure member and a fluid pressure operable member connected with said closure member; a pressure-responsive control device for effecting closing and allowing opening of said main valve having the opposite sides thereof subject to the fluid pressures at the inlet and outlet sides of said main valve; and means for venting one side of said pressure-responsive device to a zone under a different pressure and for effecting balancing of the fluid pressures on the inlet and outlet sides of said main valve when said main valve is closed.

7. Fluid flow control means, comprising: a fluid pressure operated main valve including an inlet chamber, an outlet chamber, a flow control element for controlling the flow between said chambers, and a pressure chamber for operating fluid for actuating said flow control element; and control means for said main valve for effecting automatic closing of said main valve in the event of a predetermined pressure drop thereacross, said control means including a pressure-responsive device subject to the differential pressure across said main valve; means actuated by said pressure-responsive device arranged to control the admission and exhaust of operating fluid to said pressure chamber of said main valve to effect opening and allow closing of said main valve; and means for balancing the fluid pressures in said inlet and outlet chambers of said main valve when said flow control element is in closed position.

8. Fluid flow control means, comprising: a fluid pressure operated main valve including an inlet chamber, an outlet chamber, a flow control element for controlling the flow between said chambers, and a pressure chamber for operating fluid for actuating said flow control element; and control means for said main valve for effecting automatic closing of said main valve in the event of a predetermined pressure drop thereacross, said control means including a pressure-responsive device subject to the differential pressure across said main valve; ported means actuated by said pressure-responsive device arranged to control the admission and exhaust of operating fluid to said pressure chamber of said main valve to effect opening and allow closing of said main valve; means for balancing the fluid pressures in said inlet and outlet chambers of said main valve when said flow control element is in closed position; and means for reducing the pressure on the side of the pressure-responsive device subject to the pressure on the inlet side of said main valve to below that on the side thereof subject to the pressure on the outlet side of said main valve to enable said pressure-responsive device to actuate said ported means to admit operating fluid under pressure into said pressure chamber of said main valve to effect opening of said main valve.

9. Fluid flow control means, comprising: a main valve, said main valve having an inlet chamber, an outlet chamber, a closure element for controlling the flow between said chambers, and a pressure chamber adapted to receive operating fluid under pressure for actuating said closure member; a conduit including a manually controlled by-pass valve arranged to establish communication between said inlet and said outlet chambers to balance the fluid pressures across said main valve when said closure element is in closed position; a pressure-responsive device including a fluid pressure operable member and chambers on opposite sides of said member subject to the pressure in said inlet and outlet chambers, respectively; and means actuated by said pressure-responsive device for controlling the admission and exhaust of operating fluid to said pressure chamber to control the opening and closing of said main valve.

10. Fluid flow control means, comprising: a main valve, said main valve having an inlet chamber, an outlet chamber, a closure element for controlling the flow between said chambers, and a pressure chamber adapted to receive operating fluid under pressure for actuating said closure member; a conduit including a manually controlled by-pass valve arranged to establish communication between said inlet and said outlet chambers to balance the fluid pressures across said main valve when said closure element is in closed position; a pressure-responsive device including a fluid pressure operable member and chambers on opposite sides of said member subject to the pressure in said inlet and outlet chambers, respectively; means actuated by said pressure-responsive device for controlling the admission and exhaust of operating fluid to said pressure chamber to effect opening and allow closing of said main valve; and manually controlled means for venting the pressure in the chamber of said pressure-responsive device subject to said inlet pressure to a zone of relatively low pressure.

11. Fluid flow control means, comprising: a main valve, said main valve having an inlet chamber, an outlet chamber, a closure element for controlling the flow between said chambers, and a pressure chamber adapted to receive operating fluid under pressure for actuating said closure member; conduit means including a normally closed by-pass valve operable at will arranged to establish communication between said inlet and said outlet chambers to balance the fluid pressures across said main valve when said closure element is in closed position; a pressure-responsive device including a diaphragm and chambers on the opposite sides of said diaphragm subject to the pressure in said inlet and outlet chambers, respectively, of said main valve; means biasing said diaphragm in opposition to the inlet pressure acting thereon; and a pilot valve actuated by said pressure-responsive means and including a ported element for controlling the admission of operating fluid into and the exhaust of operating fluid from said pressure chamber to effect opening and allow closing, respectively, of said main valve.

12. Fluid flow control means, comprising: a main valve, said main valve having an inlet chamber, an outlet chamber, a closure element for controlling the flow between said chambers, and a pressure chamber adapted to receive operating fluid under pressure for actuating said closure member; conduit means including a normally closed by-pass valve operable at will arranged to establish communication between said inlet and said outlet chambers to balance the fluid pressures across said main valve when said closure element is in closed position; a pressure-responsive device including a diaphragm and chambers on the opposite sides of said diaphragm subject to the pressure in said inlet and outlet chambers, respectively, of said main valve; means biasing said diaphragm in opposition to the inlet pressure acting thereon; a pilot valve actuated by said pressure-responsive means and including a ported element for controlling the admission of operating fluid into and the exhaust of operating fluid from said pressure chamber to effect opening and allowing closing, respectively, of said main valve; and means including a manually operated valve for venting the pressure in the chamber of said pressure-responsive device subject to said inlet pressure to a zone of relatively low pressure.

13. Fluid flow control means, comprising: a main valve, said main valve having an inlet chamber, an outlet chamber, a seat between said chambers, a closure element cooperable with said seat for controlling the flow between said chambers, means normally urging said closure element in a direction toward said seat, and a pressure chamber adapted to receive operating fluid under pressure for effecting movement of said closure element in a direction away from said seat; conduit means including a normally closed by-pass valve arranged to establish communication between said inlet and said outlet chambers to balance the fluid pressures in said chambers when said closure element is engaged with said seat; a pressure-responsive device including a fluid pressure operable member dividing the same into a first chamber and a second chamber; a first conduit means for conducting fluid under pressure from said inlet chamber of said main valve to said first chamber of said pressure-responsive device, and a second conduit means for conducting fluid under pressure from said outlet chamber of said main valve to said second chamber of said pressure-responsive device; means biasing said member in the same direction as the pressure fluid in said second chamber of said pressure-responsive device; a pilot valve actuated by said member of said fluid pressure-responsive device; conduit means connecting said pilot valve with said pressure chamber of said main valve, said pilot valve including a ported element for controlling the admission of operating fluid into and the exhaust of spent operating fluid from said pressure chamber of said main valve to effect positive opening and allow closing, respectively, of said main valve; and manually controlled means for venting said first chamber of said pressure-responsive device to a zone of relatively low pressure and for actuating said by-pass valve to effect opening of said valve.

14. Fluid flow control means, comprising: a main valve, said main valve having an inlet chamber, an outlet chamber, a seat between said chambers, a closure element cooperable with said seat for controlling the flow between said chambers, and a pressure chamber adapted to receive operating fluid under pressure for effecting movement of said closure element relative to said seat; a pressure-responsive device including a fluid pressure operable member dividing the same into a first chamber and a second chamber; a first conduit means for conducting fluid under pressure from said inlet chamber of said main valve to said first chamber of said pressure-responsive device, and a second conduit means for conducting fluid under pressure from said outlet chamber of said main valve to said second chamber of said pressure-responsive device; a vent conduit connected with said first chamber of said pressure-responsive device for venting said first chamber to a zone of relatively low pressure; means actuated by said member of said fluid pressure-responsive device for controlling the admission of operating fluid into and the exhaust of operating fluid from said pressure chamber of said main valve to effect opening and closing of said main valve; and a valve connected in said vent conduit for reducing the pressure in said first chamber of said pressure-responsive device at will, whereby to increase the speed of operation thereof.

15. Fluid flow control means, comprising: a main valve, said main valve having an inlet chamber, an outlet chamber, a seat between said chambers, a closure element cooperable with said seat for controlling the flow between said chambers, means normally urging said closure element in a direction toward said seat, and a pressure chamber adapted to receive operating fluid under pressure for effecting movement of said closure element in a direction away from said seat; a pressure-responsive device including a fluid pressure operable member dividing the same into a first chamber and a second chamber; a first conduit means for conducting fluid under pressure from said inlet chamber of said main valve to said first chamber of said pressure-responsive device, and a second conduit means for conducting fluid under pressure from said outlet chamber of said main valve to said second chamber of said pressure-responsive device; a vent conduit connected with said first chamber of said pressure-responsive device for venting said first chamber to a zone of relatively low pressure, said first conduit means being smaller in diameter than said vent conduit, whereby said vent conduit can vent fluid from said first chamber at a faster rate than said first conduit means can supply fluid to said first chamber; means actuated by said member for controlling the supply and exhaust of operating fluid to said pressure chamber of said main valve; and a valve connected in said vent conduit for reducing the pressure in said first chamber of said pressure-responsive device at will, whereby to increase the speed of operation thereof.

16. Fluid flow control means, comprising: a main valve, said main valve having an inlet chamber, an outlet chamber, a closure element for controlling the flow between said chambers, and a pressure chamber adapted to receive operating fluid under pressure for actuating said closure member; piping including a normally closed, manually actuated by-pass valve arranged to establish communication between said inlet and said outlet chambers to balance the fluid pressures across said main valve when said closure element is in closed position; a pressure-responsive device including a diaphragm and chambers on the opposite sides of said diaphragm subject to the pressure in said inlet and outlet chambers, respectively, of said main valve; means biasing said diaphragm in opposition to the inlet pressure acting thereon; a pilot valve actuated by said pressure-responsive means and including a ported element for controlling the admission of operating fluid into and the exhaust of operating fluid from said pressure chamber to effect opening and allow closing, respectively, of said main valve; and means including a manually actuated valve for venting the pressure in the chamber of said pressure-responsive device subject to said inlet pressure to a zone of relatively low pressure.

17. Fluid flow control means, comprising: a fluid pressure operated main valve; and automatic control means for effecting automatic closing of said main valve in the event of a predetermined pressure drop across said main valve, said automatic control means including a pressure-responsive device subject to the differential pressure across said main valve; means actuated by said pressure-responsive device for effecting closing of said main valve; and manually controlled means for effecting opening of said main valve, after said main valve has been closed by said automatic control means, including a manually operated pilot valve and a fluid pressure operated by-pass valve controlled by said pilot valve and arranged to conduct fluid under pressure from the inlet to the outlet side of said main valve.

18. Fluid flow control means, comprising: a main valve, said main valve having an inlet chamber, an outlet chamber, a closure element for controlling the flow between said chambers, and a pressure chamber adapted to receive operating fluid under pressure for actuating said closure member; piping including a normally closed fluid pressure operated by-pass valve arranged to establish communication between said inlet and said outlet chambers to balance the fluid pressures across said main valve when said closure element is in closed position; a pressure-responsive device including a diaphragm and chambers on the opposite sides of said diaphragm subject to the pressure in said inlet and outlet chambers, respectively, of said main valve; means biasing said diaphragm in opposition to the inlet pressure acting thereon; a pilot valve actuated by said pressure-responsive means and including a ported element for controlling the admission of operating fluid into and the exhaust of operating fluid from said pressure chamber to effect opening and allow closing, respectively, of said main valve; and means including a manually controlled valve for controlling the supply and exhaust of operating fluid to said by-pass valve.

19. Fluid flow control means, comprising: a main valve, said main valve having an inlet chamber, an outlet chamber, a closure element for controlling the flow between said chambers, and a pressure chamber adapted to receive operating fluid under pressure for actuating said closure member; piping including a normally closed fluid pressure operated by-pass valve arranged to establish communication between said inlet and said outlet chambers to balance the fluid pressures across said main valve when said closure element is in closed position; a pressure-responsive device including a diaphragm and chambers on the opposite sides of said diaphragm subject to the pressure in said inlet and outlet chambers, respectively, of said main valve; means biasing said diaphragm in opposition to the inlet pressure acting thereon; a pilot valve actuated by said pressure-responsive means and including a ported element for controlling the admission of operating fluid into and the exhaust of operating fluid from said pressure chamber to effect opening and allow closing, respectively, of said main valve; and means for substantially simultaneously exhausting operating fluid from said fluid pressure operated by-pass valve and venting the chamber of said pressure-responsive device subject to said inlet pressure to a zone of relatively low pressure.

20. Fluid flow control means, comprising: a main valve, said main valve having an inlet chamber, an outlet chamber, a seat between said chambers, a closure element cooperable with said seat for controlling the flow between said chambers, and a pressure chamber adapted to receive operating fluid under pressure for effecting movement of said closure element in a direction away from said seat; conduit means including a normally closed fluid pressure operated by-pass valve arranged to establish communication between said inlet and said outlet chambers to balance the fluid pressures in said chambers when said closure element is engaged with said seat; a pressure-responsive device including a fluid pressure operable member dividing the same into a first chamber and a second chamber; a first conduit means for conducting fluid under pressure from said inlet chamber of said main valve to said first chamber of said pressure-responsive device, and a second conduit means for conducting fluid under pressure from said outlet chamber of said main valve to said second chamber of said pressure-responsive device; a pilot valve actuated by said member of said fluid pressure-responsive device; conduit means connecting said pilot valve with said pressure chamber of said main valve, said pilot valve including a ported element for controlling the admission of operating fluid into and the exhaust of spent operating fluid from said pressure chamber of said main valve to effect positive opening and allow closing, respectively, of said main valve; and means including a manually operated pilot valve arranged to substantially simultaneously vent said first chamber of said pressure-responsive device to a zone of relatively low pressure and to exhaust operating fluid from said by-pass valve to effect opening of said by-pass valve.

21. Fluid flow control means, comprising: a main valve, said main valve having an inlet chamber, an outlet chamber, a seat between said chambers, a closure element cooperable with said seat for controlling the flow between said chambers, means normally urging said closure element in a direction toward said seat, and a pressure chamber adapted to receive operating fluid under pressure for effecting movement of said closure element in a direction away from said seat; conduit means including a normally closed fluid pressure operated by-pass valve arranged to establish communication between said inlet and said outlet chambers to balance the fluid pressures in said chambers when said closure element is engaged with said seat; a pressure-responsive device including a fluid pressure operable member dividing the same into a first chamber and a second chamber; a first conduit means for conducting fluid under pressure from said inlet chamber of said main valve to said first chamber of said pressure-responsive device, and a second conduit means for conducting fluid under pressure from said outlet chamber of said main valve to said second chamber of said pressure-responsive device; means biasing said member in the same direction as the pressure fluid in said second chamber of said pressure-responsive device; a vent conduit connected with said first chamber of said pressure-responsive device for venting said first chamber to a zone of relatively low pressure, said first conduit means being smaller in diameter than said vent conduit, whereby said vent conduit can vent fluid from said first chamber at a faster rate than said first conduit means can supply fluid to said first chamber; a pilot valve actuated by said member of said fluid pressure-responsive device; conduit means connecting said pilot valve with said pressure chamber of said main valve, said pilot valve including a ported element for controlling the admission of operating fluid into and the exhaust of spent operating fluid from said pressure chamber of said main valve to effect positive opening and allow closing, respectively, of said main valve; and means including a manually operated pilot valve arranged to substantially simultaneously vent said first chamber of said pressure-responsive device to a zone of relatively low pressure and to exhaust operating fluid from said by-pass valve to effect opening of said by-pass valve.

22. Fluid flow control means, comprising: a fluid pressure operated main valve; and control means for effecting automatic closing of said main valve in the event of a predetermined pressure drop across said main valve, said automatic control means including a pressure-responsive device subject to the differential pressure across said main valve, and pilot valve means actuated by said pressure-responsive device arranged to effect closing of said main valve, said pilot valve means also being manually operable to effect venting of one side of said pressure-responsive device to a zone of relatively low pressure.

23. Fluid flow control means, comprising: a fluid pressure operated main valve and control means for effecting automatic closing of said main valve in the event of a predetermined pressure drop across said main valve, said automatic control means including a pressure-responsive device subject to the differential pressure across said main valve, pilot valve means actuated by said pressure-responsive device arranged to effect closing of said main valve, a resilient, yieldable connection between said pilot valve means and said pressure responsive device, and manually operable means for actuating said pilot valve means to effect opening of said main valve by overcoming the resistance offered by said resilient, yieldable connection.

24. Fluid flow control means, comprising: a fluid pressure operated main valve and control means for effecting automatic closing of said main valve in the event of a predetermined pressure drop across said main valve, said automatic control means including a pressure-responsive device subject to the differential pressure across said main valve, and pilot valve means actuated by said pressure-responsive device arranged to effect closing of said main valve, said pilot valve means also being manually operable to simultaneously effect venting of the side of said pressure-responsive device subject to inlet pressure to a zone of relatively low pressure and to balance the fluid pressures upon the opposite sides of said main valve.

25. Fluid flow control means, comprising: a fluid pressure operated main valve; control means for effecting automatic closing of said main valve in the event of a predetermined pressure drop across said main valve, said automatic control means including a pressure-responsive device subject to the differential pressure across said main valve, and a combined manually and automatically operable pilot valve, said pilot valve being automatically operable by said pressure-responsive device to effect closing of said main valve; and a fluid pressure operable valve arranged, when open, to balance the fluid pressures on the opposite sides of said main valve, said pilot valve being manually operable to effect opening of said by-pass valve.

26. Fluid flow control means, comprising: a fluid pressure operated main valve; control means for effecting automatic closing of said main valve in the event of a predetermined pressure drop across said main valve, said automatic control means including a pressure-responsive device subject to the differential pressure across said main valve, and a combined manually and automatically operable pilot valve, said pilot valve being automatically operable by said pressure-responsive device to effect closing of said main valve; and a fluid pressure operable valve arranged, when open, to balance the fluid pressures on the opposite sides of said main valve, said pilot valve being manually operable to effect opening of said by-pass valve and to vent the side of said pressure-responsive device subject to inlet pressure to a zone of relatively low pressure.

DONALD G. GRISWOLD.

References Cited in the file of this patent

UNITED STATES PATENTS

| Number | Name | Date |
|---|---|---|
| 657,707 | Reese | Sept. 11, 1900 |
| 760,595 | Wiesebrock | May 24, 1904 |
| 820,598 | Peterson | May 15, 1906 |
| 821,867 | Farmer | May 29, 1906 |
| 1,514,839 | Edwards | Nov. 11, 1924 |
| 1,554,673 | Heath | Sept. 22, 1925 |
| 1,697,608 | Patterson | Jan. 1, 1929 |
| 1,958,262 | Boland | May 8, 1934 |
| 2,071,542 | Kidney | May 25, 1937 |
| 2,227,297 | Coy | Dec. 31, 1940 |
| 2,234,795 | Brown | Mar. 11, 1941 |
| 2,309,848 | King | Feb. 2, 1943 |
| 2,418,743 | Baker | Apr. 8, 1947 |